United States Patent
Kwon et al.

(10) Patent No.: US 10,564,676 B2
(45) Date of Patent: Feb. 18, 2020

(54) ROLLABLE DISPLAY APPARATUS

(71) Applicant: LG Display Co., Ltd., Seoul (KR)

(72) Inventors: Hoiyong Kwon, Osan-si (KR); DongYoon Kim, Osan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/158,592

(22) Filed: Oct. 12, 2018

(65) Prior Publication Data
US 2019/0138058 A1 May 9, 2019

(30) Foreign Application Priority Data
Nov. 7, 2017 (KR) .......................... 10-2017-0147337

(51) Int. Cl.
*G06F 1/16* (2006.01)
*G09G 3/22* (2006.01)
*H04N 5/64* (2006.01)
*G09F 9/30* (2006.01)

(52) U.S. Cl.
CPC .......... *G06F 1/1652* (2013.01); *G06F 1/1601* (2013.01); *G09F 9/301* (2013.01); *G09G 3/22* (2013.01); *H04N 5/64* (2013.01); *G06F 2200/1612* (2013.01)

(58) Field of Classification Search
USPC ........................................................ 361/749
See application file for complete search history.

(56) References Cited

U.S. PATENT DOCUMENTS

| | | |
|---|---|---|
| 9,877,384 B2 | 1/2018 | Lee et al. |
| 2016/0187929 A1* | 6/2016 | Kim ...................... G06F 1/1652 345/184 |
| 2016/0324014 A1* | 11/2016 | Lee ....................... G06F 1/1652 |

FOREIGN PATENT DOCUMENTS

KR  10-2016-0129947 A  11/2016

* cited by examiner

*Primary Examiner* — Andargie M Aychillhum
(74) *Attorney, Agent, or Firm* — Morgan, Lewis & Bockius LLP (57) ABSTRACT

A rollable display apparatus includes a flexible display panel, a panel extension sheet connected to the flexible display panel, and a housing module. The flexible display panel is configured to be loaded into and unloaded from the housing module. The rollable display apparatus further includes a roller part in the housing module that has a double roller structure. The roller part is configured to individually wind and unwind each of the panel extension sheet and the flexible display panel.

20 Claims, 5 Drawing Sheets

ROLLABLE DISPLAY APPARATUS

CROSS-REFERENCE TO RELATED APPLICATIONS

This application claims the benefit of the Korean Patent Application No. 10-2017-0147337 filed on Nov. 7, 2017, which is hereby incorporated by reference as if fully set forth herein.

BACKGROUND

Technical Field

The present disclosure relates to a rollable display apparatus and an apparatus for inspecting the same.

Discussion of the Related Art

Generally, display apparatuses including a flat display panel, such as liquid crystal display (LCD) apparatuses, organic light-emitting display apparatuses, light-emitting diode display apparatuses, and electrophoretic display apparatuses, are applied to notebook computers, portable electronic devices, televisions (TVs), monitors, etc.

A related art flat display panel uses a glass substrate having no flexibility, and due to this, has limitations in application and usability. In contrast, rollable display apparatuses, which may be bent by using a flexible substrate having flexibility, like plastic, instead of a glass substrate having no flexibility, are attracting much attention as new display apparatuses.

However, in a related art rollable display apparatus, a lower non-display area of a flexible display panel may be narrow. For this reason, when the flexible display panel is being wound or unwound, a lower end of a display area may be hidden by a housing module, and a panel driving circuit unit connected to the flexible display panel may be wound around a roller, causing damage to the circuits and lines in the panel driving circuit unit. Due to this, the reliability of the panel driving circuit unit is reduced.

Information disclosed in this Background section was already known to the inventors of the inventive concept before achieving the present disclosure or is technical information acquired in the process of achieving the present disclosure. Therefore, it may contain information that does not form the prior art that is already known to the public in this country.

SUMMARY

Accordingly, embodiments of the present disclosure are directed to a rollable display apparatus that substantially obviates one or more problems due to limitations and disadvantages of the related art.

An aspect of the present disclosure is to provide a rollable display apparatus in which a whole display area of a flexible display panel is unloaded to the outside of a housing module.

Another aspect of the present disclosure is to provide a rollable display apparatus for enhancing the reliability of a panel driving circuit unit connected to a flexible display panel.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a rollable display apparatus, comprising a flexible display panel; a panel extension sheet connected to the flexible display panel; a housing module, wherein the flexible display panel is configured to be loaded into and unloaded from the housing module; and a roller part in the housing module and having a double roller structure, wherein the roller part is configured to individually wind and unwind each of the panel extension sheet and the flexible display panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principle of the disclosure. In the drawings.

DETAILED DESCRIPTION OF THE DISCLOSURE

Reference will now be made in detail to the example embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where "comprise," "have," and "include" described in the present specification are used, another part may be added unless "only~" is used. The terms of a singular form may include plural forms unless referred to the contrary.

In construing an element, the element is construed as including an error range although there is no explicit description.

In describing a position relationship, for example, when a position relation between two parts is described as "on~," "over~," "under~," and "next~," one or more other parts may be disposed between the two parts unless "just" or "direct" is used.

In describing a time relationship, for example, when the temporal order is described as "after~," "subsequent~," "next~," and "before~," a case which is not continuous may be included unless "just" or "direct" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Hereinafter, example embodiments of a rollable display apparatus according to the present disclosure will be described in detail with reference to the accompanying drawings. In adding reference numerals to elements of each of the drawings, although the same elements are illustrated in other drawings, like reference numerals may refer to like elements.

Figure 1:
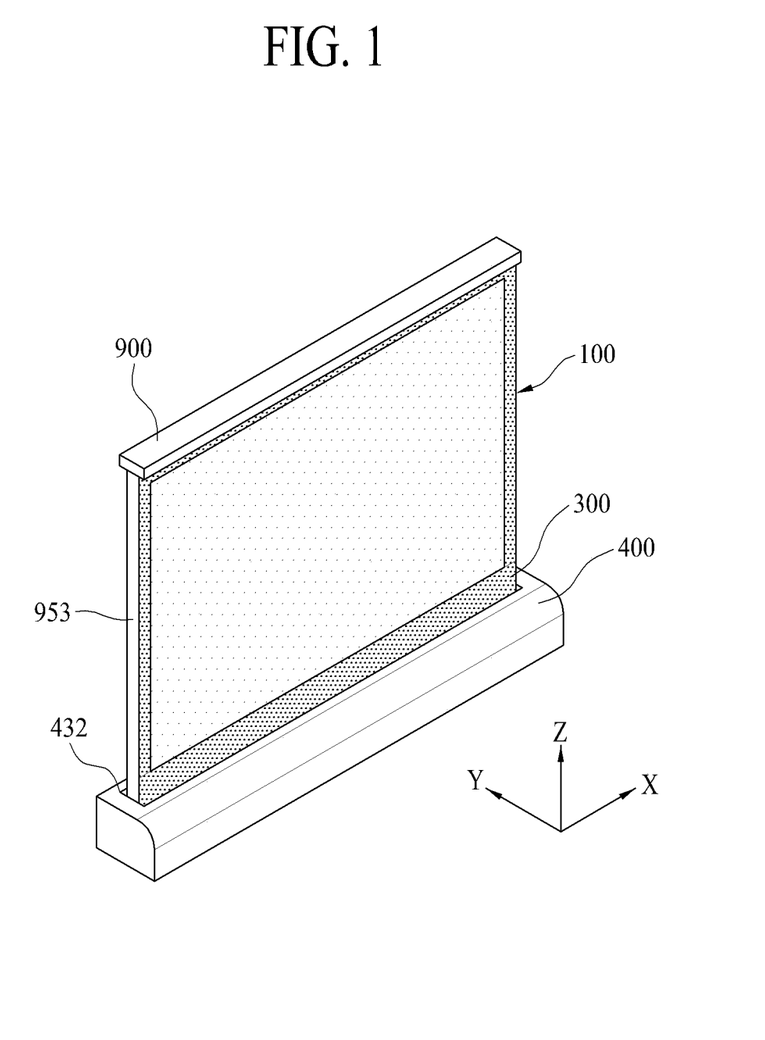
FIG. 1 is a diagram illustrating a rollable display apparatus according to an example embodiment of the present disclosure.
Figure 2:
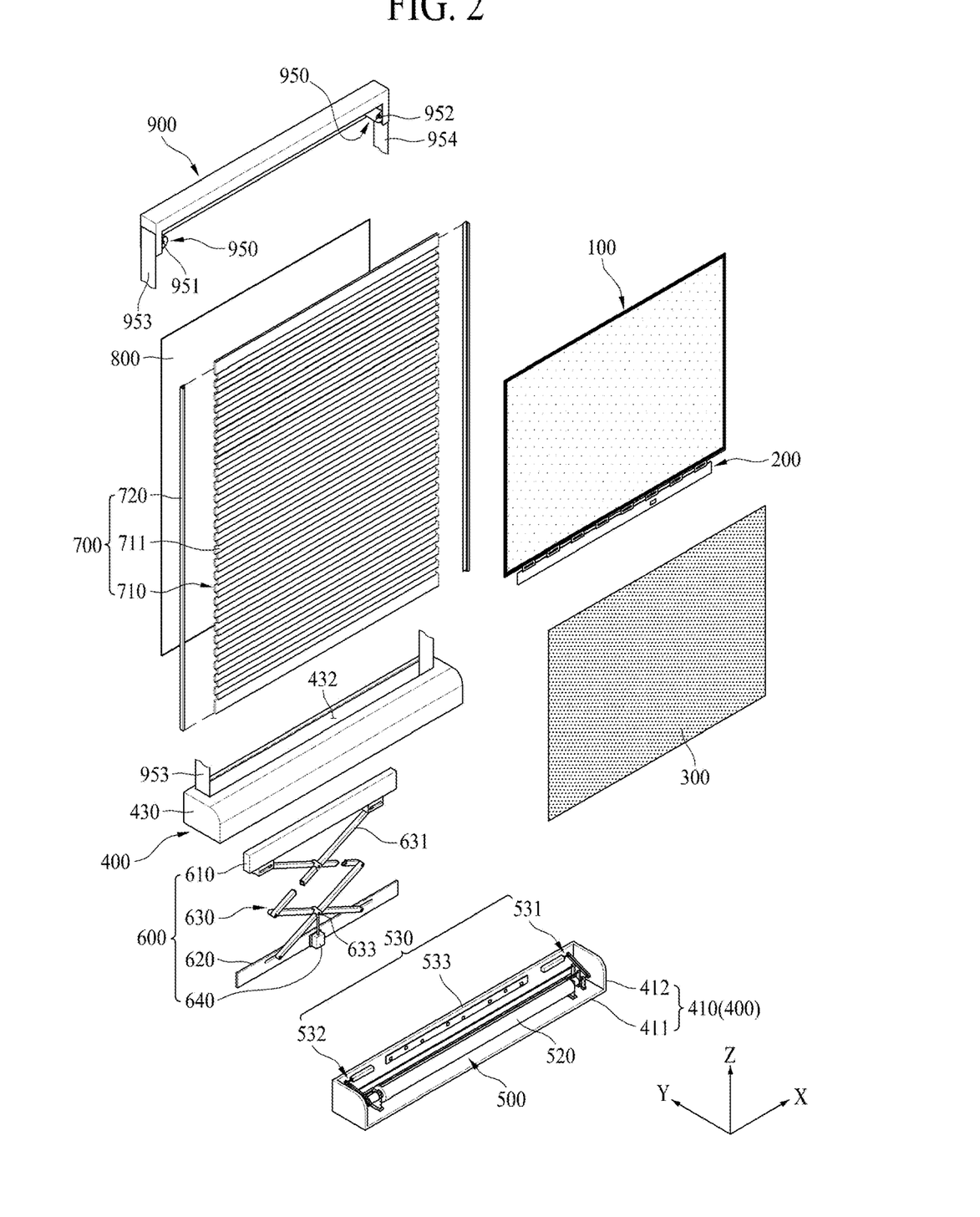
FIG. 2 is an exploded perspective view of a rollable display apparatus according to an example embodiment of the present disclosure.
Figure 3:
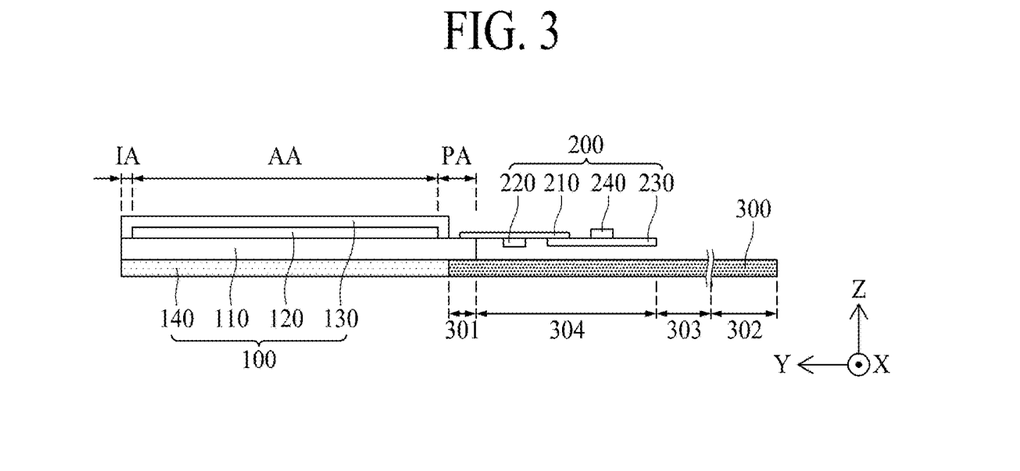
FIG. 3 is a cross-sectional view for describing a flexible display panel and a panel extension sheet illustrated in FIG. 2.

FIG. 1 is a diagram illustrating a rollable display apparatus according to an example embodiment of the present disclosure. FIG. 2 is an exploded perspective view of a rollable display apparatus according to an example embodiment of the present disclosure. FIG. 3 is a cross-sectional view for describing a flexible display panel and a panel extension sheet illustrated in FIG. 2.

With reference to FIGS. 1 to 3, the rollable display apparatus according to an example embodiment of the present disclosure may include a flexible display panel 100, a panel driving circuit unit 200, a panel extension sheet 300, a housing module 400, and a roller part 500.

The flexible display panel 100 may be a flat display panel using a flexible substrate 110. For example, the flexible display panel 100 may be a flexible organic light-emitting display panel, a flexible light-emitting diode display panel, a flexible micro light-emitting diode display panel a flexible electrophoretic display panel, or the like.

The flexible display panel 100 may include a flexible substrate 110, a pixel array 120, a pad part PP, and a cover plate 130.

The flexible substrate 110 may be a thin film transistor (TFT) array substrate and may include a display area AA, a non-display area IA surrounding the display area AA, and a pad area PA provided in the non-display area IA. The flexible substrate 110 according to an example embodiment may be a plastic substrate or a flexible glass substrate. For example, the plastic substrate may be formed of one of polyimide (PI), polyethylene terephthalate (PET), polycarbonate (PC), polyethylenapthanate (PEN), polynorborneen (PNB), polyethersulfone (PES), and cyclic olefin polymer (COP).

The pixel array 120 may include a plurality of pixels, which are provided in the display area AA defined on one surface of the flexible substrate 110.

The plurality of pixels may be respectively provided in a plurality of pixel areas defined by intersections of a plurality of gate lines and a plurality of data lines. Each of the plurality of pixels may include a display unit, which displays an image corresponding to an image signal as part of a display device. Here, the display device may be an organic light-emitting device, a light-emitting diode device, an electrophoretic display device, or the like.

The pad part PP may be provided in the pad area PA defined on the one surface of the flexible substrate 110. The pad part PP may be electrically connected to the plurality of gate lines and the plurality of data lines through a plurality of link lines.

The flexible substrate 110 may further include a gate driving embedded circuit, which is provided in one non-display area and/or the other non-display area of the non-display area IA.

The gate driving embedded circuit may be formed to be connected to each of the gate lines through a process of manufacturing a TFT of each of the pixels.

The cover plate 130 may be provided on the one surface of the flexible substrate 110 to cover the pixel area 120 and the non-display area IA, except for the pad part PP provided on the flexible substrate 111.

When the display device is an organic light-emitting device, a light-emitting diode device, or an electrophoretic display device, the cover plate 130 according to an example embodiment may be a flexible encapsulation substrate or an encapsulation layer.

According to another example embodiment, a front cover member 113 may be a flexible color filter substrate including a color filter corresponding to each pixel.

Additionally, the flexible display panel 100 may further include an optical film 140. The optical film 140 may be attached on a portion of the other surface of the flexible substrate 110, except one edge overlapping the pad part PP.

The optical film 140 according to an example embodiment may be a polarizing film. The polarizing film may circularly polarize external light reflected by TFTs and/or pixel driving lines provided in the pixel array 110, thereby enhancing the visibility and contrast ratio of the flexible display panel 100. The optical film 140 according to an example embodiment may include at least one of an anti-reflection film and a transmittance controllable film.

Additionally, the rollable display apparatus according to an example embodiment of the present disclosure may further include a touch screen for a user interface using a user touch. For example, the touch screen may be disposed between the flexible substrate 110 and the optical film 140. As another example, the touch screen may be disposed between the pixel array 120 and the cover plate 130. As another example, the touch screen may be embedded into the pixel array 120, based on an in-cell touch type. As another example, the touch screen may be formed on the other surface of the cover plate 130, e.g., through a patterning process.

The panel driving circuit unit 200 may be connected to the flexible display panel 100. That is, the panel driving circuit unit 200 may be connected to the pixel array 120 through the pad part PP provided on the flexible substrate 110. The panel driving circuit unit 200 may drive each pixel of the pixel array 120 through the pad part PP to allow the display panel 100 to display an image. The panel driving circuit unit 200 according to an example embodiment may include a plurality of flexible circuit films 210, a data driving integrated circuit (IC) 220, a printed circuit board (PCB) 230, and a timing controller 240.

Each of the plurality of flexible circuit films 210 may be attached between the pad part PP of the flexible substrate 110 and the PCB 230, e.g., through a film attachment process, and may be a tape carrier package (TCP) or a chip-on flexible board (or a chip-on film (COF)).

A first and/or last flexible circuit film(s), which is connected to the pad part PP provided in the one non-display area and/or the other non-display area of the flexible substrate 110 of the plurality of flexible circuit films 210, may transfer a gate control signal, input through the PCB 230, to the gate driving embedded circuit.

The data driving IC 220 may be provided in plurality. The plurality of data driving ICs 220 may be respectively mounted on the plurality of flexible circuit films 210, and may be connected to the pad part PP of the flexible substrate 110 through the plurality of flexible circuit films 210. The data driving IC 220 may receive pixel-based pixel data and a data control signal input through the PCB 230, convert the pixel-based pixel data into an analog data signal according to the data control signal, and supply the analog data signal to a corresponding data line through the pad part PP.

The PCB 230 may be connected to each of the plurality of flexible circuit films 210. The PCB 230 may support the timing controller 240, and may transfer signals and power between elements of the panel driving circuit unit 200. Also, various power circuits and a memory device may be mounted on the PCB 230.

The timing controller 240 may be mounted on the PCB 230, and may receive video data and a timing synchronization signal supplied from a display driving system through a user connector provided on the PCB 230. The timing controller 240 may align the video data to generate pixel-based pixel data matching a pixel arrangement structure of the display area AA, based on the timing synchronization signal, and may supply the generated pixel-based pixel data to a corresponding data driving IC 220. Also, the timing controller 240 may generate the data control signal and the gate control signal from the timing synchronization signal, control a driving timing of each of the plurality of data driving ICs 220 by using the data control signal, and control a driving timing of the gate driving embedded circuit by using the gate control signal.

The panel extension sheet 300 may be connected between the flexible display panel 100 and the roller part 500. The panel extension sheet 300 according to an example embodiment may be attached on the one edge overlapping the pad part PP of the other surface of the flexible substrate 110, and may be connected to the roller part 500. For example, with respect to an unload direction (hereinafter referred to as an elevation direction) Z in which the flexible display panel 100 is unloaded, an upper edge of the panel extension sheet 300 may be attached on the one edge of the other surface of the flexible substrate 110 and may cover the panel driving circuit unit 200. A lower edge of the panel extension sheet 300 may pass through the housing module 400 and may be physically connected to the roller part 500. Here, the panel extension sheet 300 according to an example embodiment may be disposed on the same layer as the optical film 140 of the flexible display panel 100, and in this case, the panel extension sheet 300 may have the same thickness as that of the optical film 140 to prevent a sense of beauty in design from being reduced by a step height between the panel extension sheet 300 and the optical film 140.

The panel extension sheet 300 according to an example embodiment may include a flexible material, and, for example, may include the same material as that of the flexible substrate 110, an opaque plastic material, or a flexible thin film metal material. In this case, the panel extension sheet 300 may cover a lower non-display area of the flexible display panel 100, and thus, may include a coating layer having the same color as that of the non-display area of the flexible display panel 100, for a color balance between the lower non-display area and the other non-display area of the flexible display panel 100.

The panel extension sheet 300 according to an example embodiment may include a panel connection part 301, a roller connection part 302, a sheet rolling part 303, and a circuit cover part 304.

The panel connection part 301 may be defined as an upper edge of the panel extension sheet 300. The panel connection part 301 may be attached on the one edge of the other surface of the flexible substrate 110 and may cover the pad part PP.

The roller connection part 302 may be defined as a lower edge of the panel extension sheet 300. The roller connection part 302 may pass through the housing module 400, and may be physically connected to the roller part 500. For example, the roller connection part 302 may be disposed in only the inside of the housing module 400 without being unloaded to the outside of the housing module 400.

The sheet rolling part 303 may be defined as an area between the panel connection part 301 and the roller connection part 302. When the flexible display panel 100 is being unloaded or loaded, the sheet rolling part 303 may be wound around the roller part 500, or may be unwound from the roller part 500.

The circuit cover part 304 may be defined as an area between the panel connection part 301 and the sheet rolling part 303. The circuit cover part 303 may cover the panel driving circuit unit 200. In this case, when the flexible display panel 100 is being unloaded or loaded, the circuit cover part 303 may be raised or lowered in the elevation direction Z without being wound around the roller part 500. Therefore, the circuit cover part 304 may cover the panel driving circuit unit 200 without applying a physical force to the panel driving circuit unit 200, and thus, may prevent damage to the panel driving circuit unit 200 when the flexible display panel 100 is being unloaded or loaded, thereby enhancing the reliability of the panel driving circuit unit 200.

A portion of the panel extension sheet 300, connected to the flexible display panel 100, or a portion of the circuit cover part 304 and the panel connection part 301, may be exposed at the outside of the housing module 400 when the flexible display panel 100 is unloaded. Thus, the panel driving circuit unit 200 may be prevented from being exposed at a region in front of the flexible display panel 100, and the whole display area AA of the flexible display panel 100 may be unloaded, thereby preventing a lower end of the display area AA of the flexible display panel 100 from being hidden by the housing module 400. That is, the flexible display panel 100 may be wound around or unwound from the roller part 500, and in this case, the panel extension sheet 300 may connect the roller part 500 to a lower portion of the flexible display panel 100, which vertically stands, whereby the lower end of the display area AA of the flexible display panel 100, which vertically stands, may be unloaded to the outside of the housing module 400 without being inserted into the housing module 400.

The panel extension sheet 300 may be replaced with an extension part which extends lengthwise from the optical film 140. In this case, considering a process of manufacturing the flexible display panel 100 and assembly between the flexible display panel 100 and the roller part 500, the flexible display panel 100 may be connected to the roller part 500 through the panel extension sheet 300. For example, the panel driving circuit unit 200 may be connected to the flexible display panel 100 after an attachment process of attaching the optical film 140, and in this case, the extension part of the optical film 140 may act as a process hindrance component causing interference between the panel driving circuit unit 200 and the flexible display panel 100 in a process of connecting the panel driving circuit unit 200 to the flexible display panel 100. Therefore, the flexible display panel 100 may be connected to the roller part 500 through the panel extension sheet 300.

The flexible display panel 100 may be unloaded from or loaded into the housing module 400. The housing module 400 according to an example embodiment may include a housing frame 410 and a housing cover 430.

The housing frame 410 may be provided in a box shape including an internal space and may support the roller part 500. The housing frame 410 according to an example embodiment may include a floor frame 411, which supports the roller part 500 and a sidewall frame 412, which is vertically connected to an edge of the floor frame 411 to provide an internal space on the floor frame 411.

The housing cover 430 may be an outermost case of the rollable display apparatus, covering a side surface and the internal space of the housing frame 410, and may include a panel entrance 432 through which the flexible display panel 100 is unloaded or loaded.

The roller part 500 may be installed in the housing module 400 to have a double roller structure, and may individually wind or unwind each of the panel extension sheet 300 and the flexible display panel 100. The roller part 500 according to an example embodiment may include a first roller 510, a second roller 520 including a sheet entrance 522 through which the panel extension sheet 300 is unloaded or loaded, and a roller driver 530. In an operation of winding the flexible display panel 100, the roller part 500 may wind the panel extension sheet 300, loaded through the sheet entrance 522 of the second roller 520, around an outer circumference surface of the first roller 510 according to a rotation of the first roller 510 performed based on driving of the roller driver 530. Then, the roller part 500 may wind the flexible display panel 100 around an outer circumference surface of the second roller 520 according to a rotation of the second roller 520 performed based on driving of the roller driver 530. On the other hand, in an operation of unwinding the flexible display panel 100, the roller part 500 may unwind the flexible display panel 100 wound around the second roller 520 according to a rotation of the second roller 520 performed based on driving of the roller driver 530. Then, the roller part 500 may unwind, through the sheet entrance 522 of the second roller 520, the panel extension sheet 300 wound around the first roller 510 according to a rotation of the first roller 510 performed based on driving of the roller driver 530. The roller part 500 may individually wind or unwind each of the panel extension sheet 300 and the flexible display panel 100 by using the double roller structure including the first roller 510 and the second roller 520, thereby unloading the whole display area AA of the flexible display panel 100 to the outside of the housing module 400.

In the rollable display apparatus according to an example embodiment of the present disclosure, a length of the flexible display panel 100 may extend to the housing module 400 by using the panel extension sheet 300, and each of the panel extension sheet 300 and the flexible display panel 100 may be individually wound around or unwound from the roller part 500 having the double roller structure. Therefore, the whole display area AA of the flexible display panel 100 may be unloaded to the outside of the housing module 400.

The rollable display apparatus according to an example embodiment of the present disclosure may further include a panel elevation module 600. The panel elevation module 600 may be installed in the housing module 400 and may raise or lower the flexible display panel 100 according to folding or unfolding of at least one retractable unit 630 supporting an upper portion of the flexible display panel 100 to wind or unwind the flexible display panel 100. The panel elevation module 600 according an example embodiment may include an upper frame 610, a lower frame 620, the retractable unit 630, and a link elevation unit 640.

The upper frame 610 may be coupled to an upper portion of the flexible display panel 100 and may movably support an upper portion of the retractable unit 630.

The lower frame 620 may be installed in the housing module 400. Also, the lower frame 620 may support the link elevation unit 340 and may movably support a lower portion of the retractable unit 630.

The retractable unit 630 may be installed between the upper frame 610 and the lower frame 620 to be folded or unfolded. One side of the retractable unit 630 may be movably connected to a lower surface of the upper frame 610, and the other side of the retractable unit 630 may be movably connected to the lower frame 620. The retractable unit 630 according to an example embodiment may include a plurality of links 631, which have a variable length and intersect one another, and the plurality of links 631 may be rotatably connected to one another. The plurality of links 631 may be connected to one another by a plurality of hinge members 633. The retractable unit 630 may be coupled to the upper frame 610 to support an upper portion of the flexible display panel 100, and may raise or lower the flexible display panel 100 in the elevation direction Z according to folding or unfolding performed based on driving of the link elevation unit 640 to wind or unwind the flexible display panel 100.

The link elevation unit 640 may fold or unfold the retractable unit 630 according to control by a controller to raise or lower the upper frame 610, thereby raising or lowering the flexible display panel 100. That is, the link elevation unit 640 may raise or lower a hinge member disposed in a lowermost portion of the retractable unit 630 to fold or unfold each of the plurality of links 631, thereby extending or reducing a length of the retractable unit 630. For example, in an operation of winding the flexible display panel 100, the link elevation unit 640 may lower a lowermost hinge member 633 to fold each of the plurality of links, and thus, may lower the upper frame 610 to wind the flexible display panel 100 around the roller part 500, thereby loading the flexible display panel 100 into the housing module 400. On the other hand, in an operation of unwinding the flexible display panel 100, the link elevation unit 640 may raise the lowermost hinge member 633 to unfold each of the plurality of links, and thus, may raise the upper frame 610 to unwind the flexible display panel 100 wound around the roller part 500, thereby unloading the flexible display panel 100 to the outside of the housing module 400.

The link elevation unit 640 according to an example embodiment may include a linear motor or a cylinder member, such as a pneumatic cylinder or an air cylinder including an elevation shaft connected to the lowermost hinge member. Therefore, according to an example embodiment of the present disclosure, the flexible display panel 100 may be easily raised or lowered by using the link elevation unit 640, and a configuration of the link elevation unit 640 may be simplified.

The panel elevation module 600 may wind or unwind the flexible display panel 100 around or from the roller part 500 by using the retractable unit 630, and thus, a configuration for winding or unwinding the flexible display panel 100 may be simplified.

The rollable display apparatus according to an example embodiment of the present disclosure may further include a flexible rear cover 700. The flexible rear cover 700 may be coupled to an upper portion of each of the flexible display panel 100 and the retractable unit 630, and may cover a rear surface of the flexible display panel 100. The flexible rear cover 700 may be wound around the roller part 500 according to the flexible display panel 100 being wound and may be unwound from the roller part 500 according to the flexible display panel 100 being unwound. The flexible rear cover 700 according to an example embodiment may include a panel cover part 710 and a pair of side cover parts 720.

The panel cover part 710 may cover a rear surface of the flexible display panel 100 and may bendably support the flexible display panel 100. The panel cover part 710 according to an example embodiment may include a plurality of supporting bars 711.

The plurality of supporting bars 711 may be rotatably coupled to one another and may cover the rear surface of the flexible display panel 100. The plurality of supporting bars 711 may have the same length, which may be a certain length longer than a length of the flexible display panel 100, thereby protecting a side surface of the flexible display panel 100 from an external side impact. Each of the plurality of supporting bars 711 may individually rotate based on a bending curvature of the flexible display panel 100 when the flexible display panel 100 is being wound or unwound, and thus, may guide winding of the flexible display panel 100 or unwinding of the flexible display panel 100 which vertically stands.

The pair of side cover parts 720 may surround both edges of a panel supporting part, e.g., a front surface, a side surface, and a rear surface of each of both edges of the plurality of supporting bars 711. This may reduce an external impact applied to side surfaces of the plurality of supporting bars 711. The pair of side cover parts 720 may be formed of a material having elasticity, and, for example, may be formed of silicon or urethane.

Additionally, the flexible rear cover 710 according to the example embodiment may further include a buffering member, which is attached on a panel supporting surface that faces the rear surface of the flexible display panel 100. The buffering member may include a cushion material that may be good in contraction and expansion. In this case, when the flexible display panel 100 is being wound or unwound, the buffering member may perform a buffering operation to prevent slipping between the flexible rear cover 700 and the flexible display panel 100.

The flexible rear cover 700 may cover the rear surface of the flexible display panel 100 to prevent a physical contact between the rear surface of the flexible display panel 100 and the panel elevation module 600, and to maintain the vertical flatness of the flexible display panel 100, which is vertically unloaded from the housing module 400.

The flexible display apparatus according to an example embodiment of the present disclosure may further include a rear curtain 800. The rear curtain 800 may be coupled to an upper rear surface of the panel elevation module 600 and may cover a rear surface of the panel elevation module 600. The rear curtain 800 may be wound around the roller part 500 when the panel elevation module 600 is being lowered, and when the panel elevation module 600 is being raised, the rear curtain 800 may be unwound from the roller part 500 and may cover the rear surface of the panel elevation module 600. The rear curtain 800 according to an example embodiment of the present disclosure may be formed of a flexible material (for example, a fiber material) having a color and may include a heat dissipation sheet for dissipating heat of the flexible display panel 100.

The rear curtain 800 may cover the rear surface of the panel elevation module 600 unfolded to the outside of the housing module 400, thereby concealing the rear surface of the panel elevation module 600 to enhance an aesthetic appearance of a rear surface of the rollable display apparatus.

The rollable display apparatus according to an example embodiment of the present disclosure may further include an upper cover 900 and a side curtain part 950. The upper cover 900 may be coupled to an upper portion of each of the flexible display panel 100 and the panel elevation module 600. The upper cover 900 may cover an upper edge and a side surface of the flexible display panel 100 to conceal the non-display area IA provided in the upper edge of the flexible display panel 100. The upper cover 900 according to an example embodiment may include a front part, which covers an upper front edge of the flexible display panel 100, a side part, which surrounds an upper side of the flexible display panel 100 and both sides contacting the upper side, and a rear part, which covers an upper rear surface of the panel elevation module 600 coupled to the upper rear surface of the flexible display panel 100.

The upper cover 900 may act as an outermost protection cover provided in an upper edge of the rollable display apparatus, and when the flexible display panel 100 is wound, the upper cover 900 may cover the panel entrance 432 provided in the housing module 400.

The side curtain part 950 may be installed in the upper cover 900 and may cover both side surfaces of each of the panel elevation module 600 and the flexible display panel 100. The side curtain part 950 according to an example embodiment may include a first side curtain roller 951, a second side curtain roller 952, a first side curtain 953, and a second side curtain 954.

The first side curtain roller 951 may be rotatably installed in the upper cover 900 (e.g., one side of the rear part of the upper cover 900) to be adjacent to one side surface of the flexible display panel 100. The first side curtain roller 951 may be configured to rotate based on the compression and compression restoring force of a spiral spring member. The spiral spring member embedded into the first side curtain roller 951 may be compressed based on a first direction rotation of the first side curtain roller 951 when the flexible display panel 100 is being raised, and when the flexible display panel 100 is being lowered, the spiral spring member may rotate the first side curtain roller 951 in a second direction by using the compression restoring force.

The second side curtain roller 952 may be rotatably installed in the upper cover 900 (e.g., the other side of the rear part of the upper cover 900) to be adjacent to the other side surface of the flexible display panel 100. The second side curtain roller 952 may be configured to rotate based on the compression and compression restoring force of a spiral spring member. The spiral spring member embedded into the second side curtain roller 952 may be compressed based on a second direction rotation of the second side curtain roller 952 when the flexible display panel 100 is being raised, and when the flexible display panel 100 is being lowered, the spiral spring member may rotate the second side curtain roller 952 in a first direction by using the compression restoring force.

The first side curtain 953 may be installed between the first side curtain roller 951 and the housing module 400. An upper end of the first side curtain 953 may be coupled to the first side curtain roller 951, and a lower end of the first side curtain 953 may be fixed to one sidewall of the housing module 400. When the flexible display panel 100 is lowered, the first side curtain 953 may be wound around the first side curtain roller 951 according to a second direction rotation of the first side curtain roller 951, and when the flexible display panel 100 is raised, the first side curtain 953 may be unwound from the first side curtain roller 951 according to a first direction rotation of the first side curtain roller 951. Therefore, when the flexible display panel 100 is raised, the first side curtain 953 may be unwound from the first side curtain roller 951 and may cover one side surface of each of the panel elevation module 600 and the flexible display panel 100, thereby enhancing an aesthetic appearance of one side surface of the rollable display apparatus.

The second side curtain 954 may be installed between the second side curtain roller 952 and the housing module 400. An upper end of the second side curtain 954 may be coupled to the second side curtain roller 952, and a lower end of the second side curtain 954 may be fixed to the other sidewall of the housing module 400. When the flexible display panel 100 is lowered, the second side curtain 954 may be wound around the second side curtain roller 952 according to a first direction rotation of the second side curtain roller 952, and when the flexible display panel 100 is raised, the second side curtain 954 may be unwound from the second side curtain roller 952 according to a second direction rotation of the second side curtain roller 952. Therefore, similarly to the first side curtain 953, when the flexible display panel 100 is raised, the second side curtain 954 may be unwound from the second side curtain roller 952 and may cover the other side surface of each of the panel elevation module 600 and the flexible display panel 100, thereby enhancing an aesthetic appearance of the other side surface of the rollable display apparatus.

The upper cover 900 according to an example embodiment may further include a first tension roller is installed adjacent to the first side curtain roller 951 to maintain a tension of the first side curtain 953, and a second tension roller installed adjacent to the second side curtain roller 952 to maintain a tension of the second side curtain 954.

Figure 4:
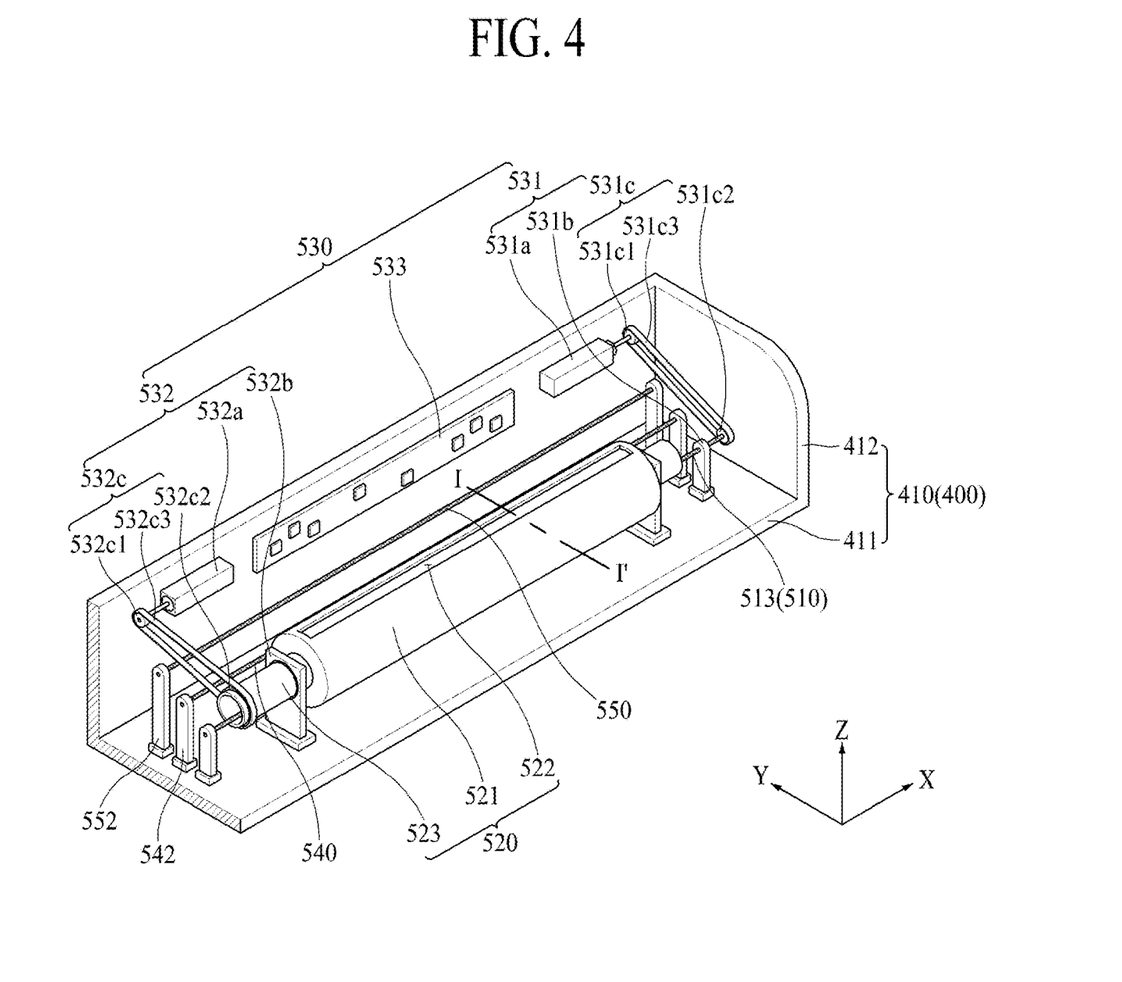
FIG. 4 is a diagram for describing a roller part illustrated in FIG. 2.
Figure 5:
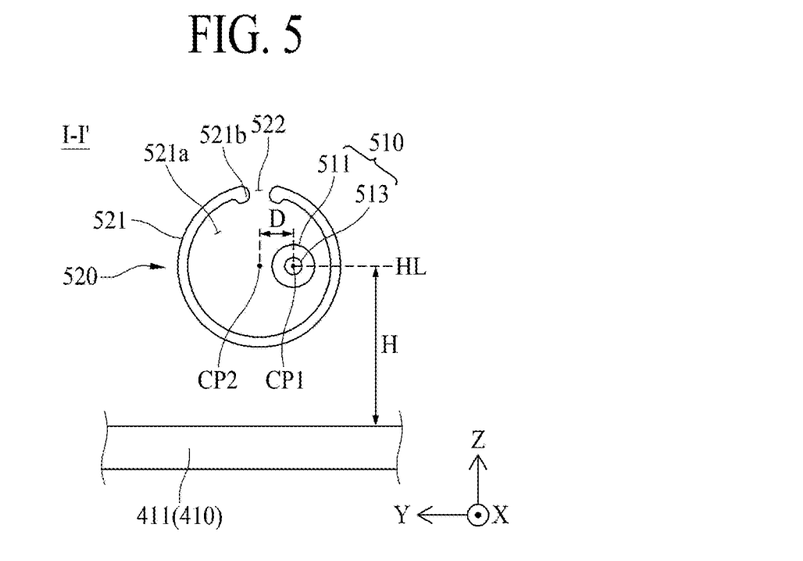
FIG. 5 is a cross-sectional view taken along line I-I' illustrated in FIG. 4.

FIG. 4 is a diagram for describing the roller part 500 illustrated in FIG. 2, and FIG. 5 is a cross-sectional view taken along line I-I' illustrated in FIG. 4.

With reference to FIGS. 2, 4, and 5, the roller part 500 according to an example embodiment of the present disclosure may include a first roller 510, a second roller 520, and a roller driver 530.

The first roller 510 may be disposed on the floor frame 411 of the housing module 400 in parallel with a first direction X, and may be physically connected to the roller connection part of the panel extension sheet 300. Here, the first direction X may be defined as a widthwise direction of the housing module 400. The first roller 510 may be wind or unwind the panel extension sheet 300 according to driving of the roller driver 530.

The first roller 510 according to an example embodiment may include a first roller body, from which the sheet rolling part of the panel extension sheet 300 is wound around or unwound, and a pair of first rotation shafts 513, which are provided on both side surfaces of the first roller body and are connected to the roller driver 530. The first roller body may include a circular bar having a diameter that is equal to or relatively greater than that of the pair of first rotation shafts 513. The first roller 510 may rotate according to a rotation of the pair of first rotation shafts 513 performed based on driving of the roller driver 530, and thus, may wind or unwind the panel extension sheet 300.

The second roller 520 may be disposed on the floor frame 411 of the housing module 400 to surround the outer circumference surface of the first roller 510. That is, the first roller 510 may pass through the second roller 520 in the first direction X, and the outer circumference surface of the first roller 510 may be surrounded by the second roller 520. The second roller 520 may rotate according to driving of the roller driver 530 to wind or unwind the flexible display panel 100. The second roller 520 according to an example embodiment may include a second roller body 521, a sheet entrance 522, and a pair of second rotation shafts 523.

The second roller body 521 may have a cylindrical shape including a hollow part 521a into which the first roller 510 is inserted. The first roller 510 may be inserted into and disposed in the hollow part 521a of the second roller body 521.

The sheet entrance 522 may be provided in the second roller body 520 in order for the circuit cover part of the panel extension sheet 300 to move into or out of the hollow part 521a of the second roller body 521, and thus, may externally expose a portion of the hollow part 521a of the second roller body 521. The sheet entrance 522 according to an example embodiment may be provided by cutting a portion of the second roller body 520. For example, the sheet entrance 522 may be a slit having a length which is parallel to the first direction X and is wider than a width of the panel extension sheet 300.

Long sides of the sheet entrance 522, which are parallel to the first direction X, may each have a cross-sectional surface having a curve shape, for preventing damage and tearing of the panel extension sheet 300 and/or the flexible display panel 100. For example, when a long side of the sheet entrance 522 has a sharp corner instead of a curve shape, the panel extension sheet 300 may be damaged or torn by a physical contact between the long side of the sheet entrance 522 and the panel extension sheet 300, which moves into or out of the sheet entrance 522. For example, when the flexible display panel 100 is wound around the outer circumference surface of the second roller 520, the flexible display panel 100 may be damaged or torn.

The pair of second rotation shafts 523 may be provided on both side surfaces of the second roller body 521 and may be connected to the roller driver 530. The pair of second rotation shafts 523 may have a diameter which is equal to or relatively less than that of the second roller body 521, and may have a diameter which is relatively greater than that of the pair of first rotation shafts 513.

A rotation center axis CP1 of the first roller 510 inserted into and disposed in the hollow part 521a of the second roller 520 may be spaced apart from a rotation center axis CP2 of the second roller 520 by a certain distance D1. That is, with respect to the first direction X, the rotation center axis CP1 of the first roller 510 and the rotation center axis CP2 of the second roller 520 may be disposed on the same horizontal line HL having the same height H from the floor frame 411 of the housing module 400, but with respect to a second direction Y parallel to a lengthwise length direction of the housing module 400, the rotation center axis CP1 of the first roller 510 may be spaced apart from the rotation center axis CP2 of the second roller 520 by the certain distance D1, and may be disposed close to one side of the hollow part 521a of the second roller 520. In this case, a separation distance D1 between the rotation center axis CP1 of the first roller 510 and the rotation center axis CP2 of the second roller 520 may be set based on a thickness of the panel extension sheet 300 wound around the first roller 510.

The roller driver 530 may individually rotate each of the first roller 510 and the second roller 520. For example, in an operation of winding the flexible display panel 100, the roller driver 530 may rotate only the first roller 510 to wind the panel extension sheet 300, loaded through the sheet entrance 522 of the second roller 520, around the outer circumference surface of the first roller 510, and then, may rotate the second roller 520 to wind the flexible display panel 100 around the outer circumference surface of the second roller 520. Also, in an operation of unwinding the flexible display panel 100, the roller driver 530 may rotate the second roller 520 to unwind the flexible display panel 100 wound around the outer circumference surface of the second roller 520, and then, may rotate the first roller 510 to unwind, through the sheet entrance 522 of the second roller 520, the panel extension sheet 300 wound around the outer circumference surface of the first roller 510. The roller driver 530 may individually wind or unwind each of the panel extension sheet 300 and the flexible display panel 100 around or from the first roller 510 and the second roller 520, thereby unloading the whole display area AA of the flexible display panel 100 to the outside of the housing module 400.

The roller driver 530 according to an example embodiment may include a first roller driver 531, a second roller driver 532, and a roller driving controller 533.

The first roller driver 531 may rotate the first roller 510 according to control by the roller driving controller 533. The first roller driver 531 according to an example embodiment may include a first driving motor 531a, a pair of first shaft brackets 531b, and a first rotation transferor 531c.

The first driving motor 531a may be installed in the sidewall frame 412 of the housing module 400 and may provide a rotational force to the first rotation transferor 531c. The first driving motor 531a according to an example embodiment may include a stepping motor or a servomotor, but is not limited thereto.

The pair of first shaft brackets 531b may be installed in the floor frame 411 of the housing module 400 and may rotatably support the pair of first rotation shafts 513.

The first rotation transferor 531c may be connected between a first rotation shaft of one of the pair of first rotation shafts 513 and a rotation shaft of the first driving motor 531a. The first rotation transferor 531c may transfer a rotational force of the first driving motor 531a to the first rotation shaft 513 to allow the first roller 510 to rotate according to a rotation of the first driving motor 531a. The first rotation transferor 531c may transfer the rotational force of the first driving motor 531a to the first rotation shaft 513, based on a rotation transfer manner using a belt and a pulley or a rotation transfer manner using a gear and a chain. The first rotation transferor 531c according to an example embodiment may include a pair of first pulleys 531c1 and 531c2, which are physically coupled to the rotation shaft of the first driving motor 531a and the first rotation shaft 513, and a belt 531c3 between the pair of first pulleys 531c1 and 531c2.

In the first roller driver 531 according to an example embodiment, the pair of first rotation shafts 513 may be rotatably supported by the sidewall frame 412 of the housing module 400, and in this case, the pair of first shaft brackets 531b may be omitted. To this end, the sidewall frame 412 of the housing module 400 may further include a first shaft supporting part, and the first shaft supporting part may include a pair of first shaft insertion holes into which the pair of first rotation shafts 513 are inserted and a pair of bearings disposed between the pair of first shaft insertion holes and the pair of first rotation shafts 513.

The second roller driver 532 may rotate the second roller 520 according to control by the roller driving controller 533. The second roller driver 532 according to an example embodiment may include a second driving motor 532a, a pair of second shaft brackets 532b, and a second rotation transferor 532c.

The second driving motor 532a may be installed in the sidewall frame 412 of the housing module 400 and may provide a rotational force to the second rotation transferor 532c. The second driving motor 532a according to an example embodiment may include a stepping motor or a servomotor, but is not limited thereto.

The pair of second shaft brackets 532b may be installed in the floor frame 411 of the housing module 400 and may rotatably support the pair of second rotation shafts 523.

The second rotation transferor 532c may be connected between a second rotation shaft of one of the pair of second rotation shafts 523 and a rotation shaft of the second driving motor 532a. The second rotation transferor 532c may transfer a rotational force of the second driving motor 532a to the second rotation shaft 523 to allow the second roller 520 to rotate according to a rotation of the second driving motor 532a. The second rotation transferor 532c may transfer the rotational force of the second driving motor 532a to the second rotation shaft 523, based on a rotation transfer manner using a belt and a pulley, or a rotation transfer manner using a gear and a chain. The second rotation transferor 532c according to an example embodiment may include a pair of second pulleys 532c1 and 532c2, physically coupled to the rotation shaft of the second driving motor 532a and the second rotation shaft 523, and a belt 532c3 between the pair of second pulleys 532c1 and 532c2.

The roller driving controller 533 may be installed in the sidewall frame 412 of the housing module 400 and may control a rotation of each of the first roller driver 531 and the second roller driver 532. In this case, the roller driving controller 533 may control driving of each of the first roller driver 531 and the second roller driver 532 to be synchronized with raising or lowering of the link elevation unit 640 included in the panel elevation module 600.

In an operation of winding the flexible display panel 100, the rollable driving controller 533 according to an example embodiment may drive the first roller driver 531 to wind the panel extension sheet 300 around the outer circumference surface of the first roller 510, may subsequently drive the second roller driver 532 to wind the panel extension sheet 300 around the outer circumference surface of the first roller 510, and then, may wind the flexible display panel 100 around the outer circumference surface of the second roller 520. In an operation of unwinding the flexible display panel 100, the rollable driving controller 533 according to an example embodiment may drive the second roller driver 532 to unwind the flexible display panel 100 wound around the outer circumference surface of the second roller 520, and then, may drive the first roller driver 531 to unwind, through the sheet entrance 522 of the second roller 520, the panel extension sheet 300 wound around the outer circumference surface of the first roller 510.

The roller part 500 according to an example embodiment of the present disclosure may further include a third roller 540 and a fourth roller 550. The third roller 540 may be installed in the housing module 400, and the flexible rear cover 700 may be wound around or unwound from the third roller 540 according to the panel elevation module 600 being raised or lowered. The third roller 540 according to an example embodiment may be installed in the floor frame 411 of the housing module 400 and may be spaced apart from the second roller 520 in parallel with the second roller 520. The third roller 540 may be configured to rotate based on the compression and compression restoring force of a spiral spring member.

The third roller 540 according to an example embodiment may be installed in the floor frame 411 of the housing module 400 and may be rotatably supported by a pair of third shaft brackets 542.

According to another example embodiment, the third roller 540 may be rotatably supported by the sidewall frame 412 of the housing module 400. In this case, the sidewall frame 412 of the housing module 400 may further include a second shaft supporting part. The second shaft supporting part may include a pair of second shaft insertion holes into which both edges of the third roller 540 are inserted, and a pair of bearings disposed between the pair of second shaft insertion holes and the both edges of the third roller 540.

The fourth roller 550 may be installed in the housing module 400, and the rear curtain 800 may be wound around or unwound from the fourth roller 550 according to the panel elevation module 600 being raised or lowered. The fourth roller 550 according to an example embodiment may be installed in the floor frame 411 of the housing module 400, and may be spaced apart from the second roller 520 and in parallel with the second roller 520. The fourth roller 550 may be configured to rotate based on the compression and compression restoring force of a spiral spring member.

The fourth roller 550 according to an example embodiment may be installed in the floor frame 411 of the housing module 400 and may be rotatably supported by a pair of fourth shaft brackets 552.

According to another example embodiment, the fourth roller 550 may be rotatably supported by the sidewall frame 412 of the housing module 400. In this case, the sidewall frame 412 of the housing module 400 may further include a third shaft supporting part. The third shaft supporting part may include a pair of third shaft insertion holes into which both edges of the fourth roller 550 are inserted, and a pair of bearings disposed between the pair of third shaft insertion holes and the both edges of the fourth roller 550.

Figure 6A:
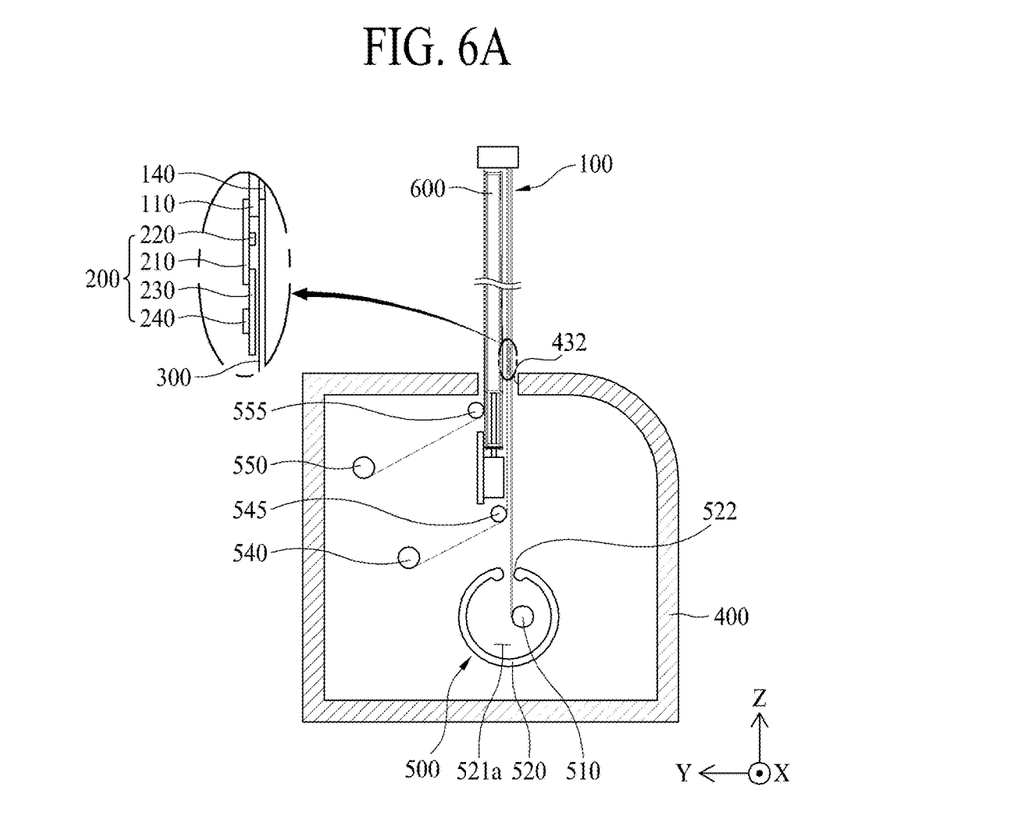
FIGS. 6A to 6C are diagrams illustrating a winding operation order in which a flexible display panel is wound, in a rollable display apparatus according to an example embodiment of the present disclosure.
Figure 6B:
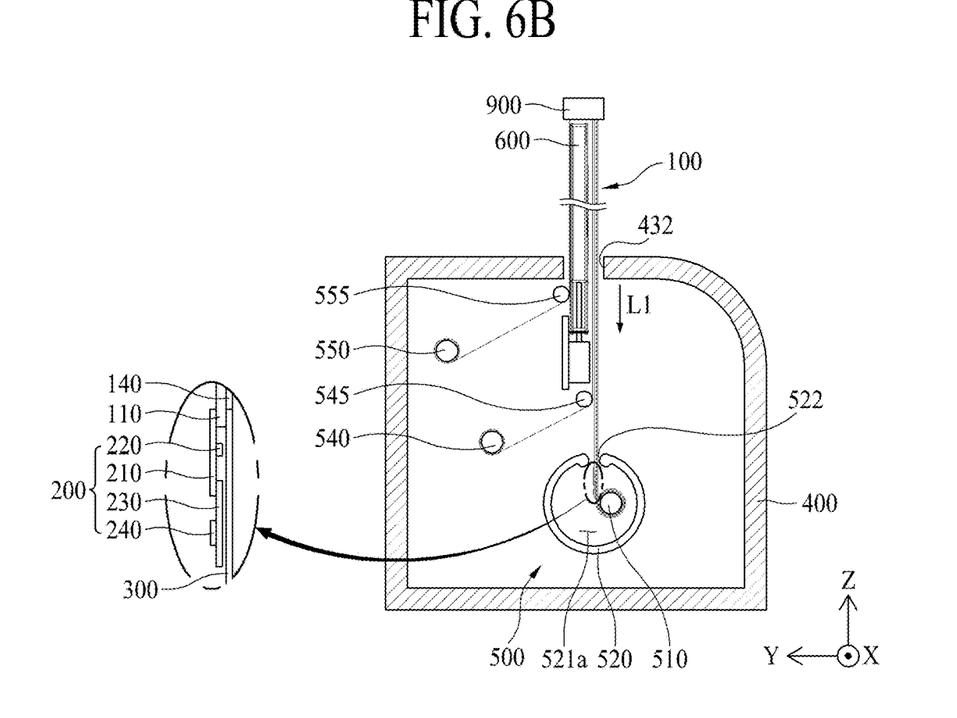
Figure 6C:
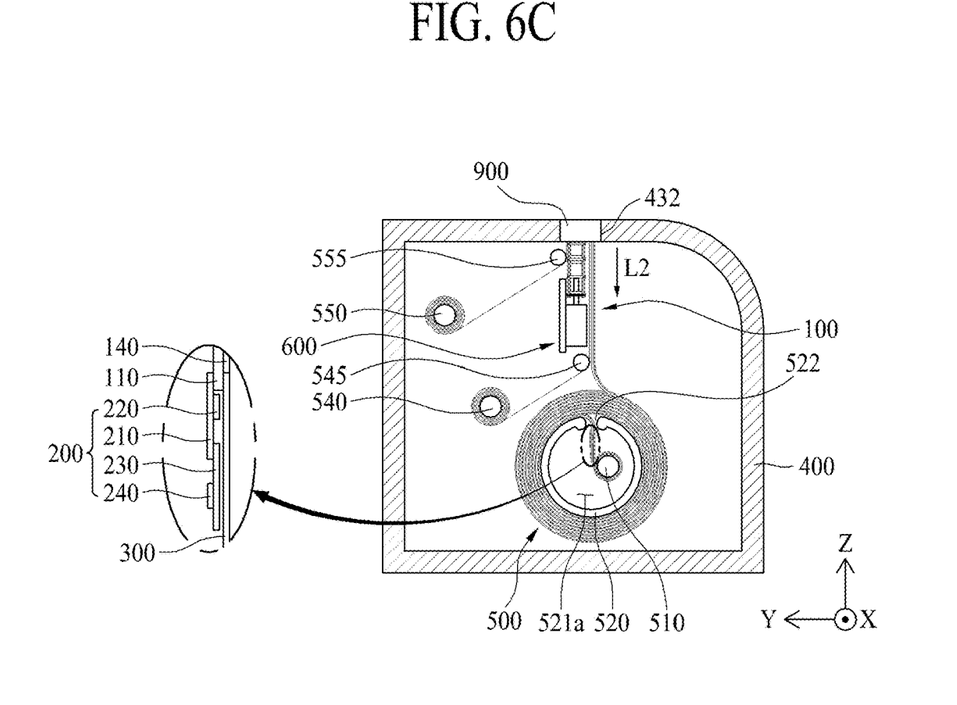

FIGS. 6A to 6C are diagrams illustrating a winding operation order in which a flexible display panel is wound, in a rollable display apparatus according to an example embodiment of the present disclosure. A winding operation of a flexible display panel in a rollable display apparatus according to an example embodiment of the present disclosure will be described below with reference to FIGS. 6A to 6C.

First, as illustrated in FIG. 6A, a flexible display panel 100 may be unloaded from a housing module 400 and may vertically stand, based on an unwinding operation. At this time, a lower end of the flexible display panel 100 may be connected to a first roller 510 of a roller part 500 through a panel extension sheet 300, and a portion of the panel extension sheet 300 connected to the flexible display panel 100 may be unloaded to the outside of the housing module 400. Also, a panel driving circuit unit 200 connected to the flexible display panel 100 may be unloaded to the outside of the housing module 400, but may be hidden by a portion of the panel extension sheet 300 (e.g., a panel connection part and a circuit cover part of the panel extension sheet 300) unloaded to the outside of the housing module 400, and may not be exposed at a region in front of the flexible display panel 100. Therefore, because the portion of the panel extension sheet 300 is unloaded to the outside of the housing module 400, a whole display area AA of the flexible display panel 100 that vertically stands may be unloaded to the outside of the housing module 400, and not inserted into the housing module 400.

Subsequently, as illustrated in FIG. 6B, based on a primary winding operation (or a sheet winding operation), the flexible display panel 100 may be lowered by a first distance L1. In synchronization with this, the panel extension sheet 300 may be wound around the first roller 510 of the roller part 500. Here, the first distance L1 may correspond to a length of a sheet rolling part defined in the panel extension sheet 300. In the primary winding operation according to an example embodiment, an upper frame 610 of a panel elevation module 600 may be primarily lowered by the first distance L1 according to driving of a link elevation unit 640 included in the panel elevation module 600, and only the first roller 510 may rotate a predetermined plurality of times, based on primary driving of the roller driver 530 synchronized with the lowering of the upper frame 610. Therefore, the lower end of the flexible display panel 100 that vertically stands may be lowered by the first distance L1 and may be loaded into a panel entrance 432 of the housing module 400, and a lower portion of the panel extension sheet 300 (e.g., the roller connection part and the sheet rolling part) may be inserted into a hollow part 521a of a second roller 520 through a sheet entrance 522 of the second roller 520 and may be wound around an outer circumference surface of the first roller MO. At this time, the panel driving circuit unit 200 connected to the flexible display panel 100 may be disposed in the hollow part 521a between the sheet entrance 522 of the second roller 520 and the first roller MO without being wound around the outer circumference surface of the first roller MO along with the panel extension sheet 300. Thus, when the panel extension sheet 300 is being wound, the panel extension sheet 300 may be prevented from being damaged by physical contact with the first roller 510.

In the primary winding operation, a lower end of a flexible rear cover 700 may be wound around a third roller 540 of the roller part 500 according to the flexible display panel 100 being lowered. Moreover, a lower end of a rear curtain 800 may be wound around a fourth roller 550 of the roller part 500 according to the flexible display panel 100 being lowered.

Subsequently, as illustrated in FIG. 6C, based on a secondary winding operation (or a panel winding operation), the flexible display panel 100 may be lowered by a second distance L2 and may be wound around the second roller 520 of the roller part 500. Here, the second distance L2 may correspond to a second direction length (or a lengthwise length) of the flexible display panel 100 parallel to a second direction Y.

In the secondary winding operation according to an example embodiment, the upper frame 610 of the panel elevation module 600 may be secondarily lowered by the second distance L2 according to driving of the link elevation unit 640 included in the panel elevation module 600, and the second roller 520 may rotate a predetermined plurality of times, based on secondary driving of the roller driver 530 synchronized with the lowering of the upper frame 610. Therefore, the other portion of the flexible display panel 100 that vertically stands may be lowered by the second distance L2, loaded into the panel entrance 432 of the housing module 400, and wound around an outer circumference surface of the second roller 520, and the panel entrance 432 of the housing module 400 may be covered by an upper cover 900 coupled to an upper portion of the flexible display panel 100.

In the secondary winding operation, the other portion of the flexible rear cover 700 that vertically stands may be additionally wound around the third roller 540 of the roller part 500 according to the flexible display panel 100 being lowered. The other portion of the rear curtain 800 that vertically stands may be additionally wound around the fourth roller 550 of the roller part 500 according to the flexible display panel 100 being lowered.

Contrasting with to the winding operation of the flexible display panel 100, the flexible display panel 100 wound around the roller part 500 may be unloaded from the housing module 400 and may vertically stand based on an unwinding operation of the flexible display panel 100.

First, the flexible display panel 100 may be raised by the second distance L2, based on a primary unwinding operation (or a panel unwinding operation). In the primary unwinding operation according to an example embodiment, the upper frame 610 of the panel elevation module 600 may be primarily raised by the second distance L2, based on driving of the link elevation unit 640 included in the panel elevation module 600, and the second roller 520 may rotate a predetermined plurality of times according to primary driving of the roller driver 530 synchronized with the raising of the upper frame 610. Therefore, the other portion, except the lower end, of the flexible display panel 100 wound around the outer circumference surface of the second roller 520 may be unwound from the second roller 520 and may be unloaded to the panel entrance 432 of the housing module 400 to vertically stand.

In the primary unwinding operation, the other portion, except the lower end, of the flexible rear cover 700 wound around the third roller 540 may be unwound from the third roller 540 according to primary unwinding of the flexible display panel 100, and may be unloaded to the panel entrance 432 of the housing module 400 to vertically stand. The other portion, except the lower end, of the rear curtain 800 may be unwound from the fourth roller 550 according to primary unwinding of the flexible display panel 100, and may be unloaded to the panel entrance 432 of the housing module 400 to vertically stand.

Subsequently, the flexible display panel 100 may be additionally raised by the first distance L1 based on a secondary unwinding operation (or a sheet unwinding operation). In synchronization with this, the panel extension sheet 300 wound around the first roller 510 may be unwound from the first roller 510. In the secondary unwinding operation according to an example embodiment, the upper frame 610 of the panel elevation module 600 may be secondarily raised by the first distance L1 according to driving of the link elevation unit 640 included in the panel elevation module 600, and only the first roller 510 may rotate a predetermined plurality of times according to secondary driving of the roller driver 530 synchronized with the raising of the upper frame 610. Therefore, as illustrated in FIG. 6A, the lower end of the flexible display panel 100 may be raised by the first distance L1 and may be unloaded to the outside of the housing module 400 to vertically stand, and the sheet rolling part of the panel extension sheet 300 may be unwound from the first roller 510 according to the rotation of the first roller 510, whereby a portion of the panel extension sheet 300 (e.g., the roller connection part and the sheet rolling part of the panel extension sheet 300) may be unloaded to the panel entrance 432 of the housing module 400 to vertically stand.

In the secondary unwinding operation, the lower end of the flexible rear cover 700 wound around the third roller 540 may be additionally unwound from the third roller 540 according to the secondary unwinding of the flexible display panel 100. Moreover, the lower end of the rear curtain 800 may be additionally unwound from the fourth roller 550 according to the secondary unwinding of the flexible display panel 100.

In an embodiment of the present disclosure, a length of the flexible display panel 100 may extend to the housing module 400 through the panel extension sheet 300, and each of the panel extension sheet 300 and the flexible display panel 100 may be individually wound around or unwound from the roller part 500 having the double roller structure. Therefore, the whole display area AA of the flexible display panel 100 may be unloaded to the outside of the housing module 400. Thus, all of an image displayed by the flexible display panel 100 may be provided to a viewer. Also, in an embodiment of the present disclosure, the panel extension sheet 300 may cover the panel driving circuit unit 200 unloaded to the outside of the housing module 400, and in an operation of loading and unloading the flexible display panel 100, the panel driving circuit unit 200 may not be wound around the roller part 500. Accordingly, damage to the panel driving circuit unit 200 may be prevented, thereby enhancing the reliability of the panel driving circuit unit 200.

The above-described features, structures, and effects of the present disclosure are included in at least one example embodiment of the present disclosure, but are not limited to only one example embodiment. Furthermore, the features, structures, and effects described in at least one example embodiment of the present disclosure may be implemented through combination or modification of other embodiments by those skilled in the art. Therefore, content associated with the combination and modification should be construed as being within the scope of the present disclosure.

As described above, according to the example embodiments of the present disclosure, the whole display area of the flexible display panel may be unloaded to the outside of the housing module, and thus, all of an image displayed by the flexible display panel may be provided to a viewer. Also, according to the example embodiments of the present disclosure, damage to the panel driving circuit unit connected to the flexible display panel may be prevented, thereby enhancing the reliability of the panel driving circuit unit.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:
1. A rollable display apparatus, comprising:
a flexible display panel;
a panel extension sheet connected to the flexible display panel;

a housing module, wherein the flexible display panel is configured to be loaded into and unloaded from the housing module;
a roller part in the housing module and having a double roller structure,
wherein the roller part is configured to individually wind and unwind each of the panel extension sheet and the flexible display panel; and
a panel driving circuit unit connected to the flexible display panel,
wherein the panel extension sheet covers the panel driving circuit unit.

2. The rollable display apparatus of claim 1, wherein:
when the flexible display panel is unloaded, a portion of the panel extension sheet connected to the flexible display panel is exposed to an outside of the housing module.

3. The rollable display apparatus of claim 1, wherein the roller part further comprises:
a first roller connected to the panel extension sheet to wind and unwind the panel extension sheet;
a second roller surrounding an outer circumference surface of the first roller to wind and unwind the flexible display panel; and
a roller driver configured to individually rotate each of the first roller and the second roller,
wherein the second roller includes a sheet entrance, and the panel extension sheet is configured to move through the sheet entrance.

4. The rollable display apparatus of claim 3, wherein:
the second roller includes a roller body having a hollow part, and the first roller is inside the hollow part; and
the sheet entrance is provided by a cut portion of the roller body.

5. The rollable display apparatus of claim 3, wherein:
the panel extension sheet configured to move through the sheet entrance of the second roller is wound around the outer circumference surface of the first roller by rotating only the first roller;
the flexible display panel is wound around an outer circumference surface of the second roller by rotating the second roller;
the flexible display panel wound around the outer circumference surface of the second roller is unwound by rotating the second roller; and
the panel extension sheet wound around the outer circumference surface of the first roller is unwound through the sheet entrance of the second roller by rotating only the first roller.

6. The rollable display apparatus of claim 3, wherein the roller driver comprises:
a first roller driver configured to rotate the first roller;
a second roller driver configured to rotate the second roller; and
a roller driving controller configured to control a rotation of each of the first roller driver and the second roller driver.

7. The rollable display apparatus of claim 3, wherein:
when the panel extension sheet is wound, the panel driving circuit unit is disposed in a hollow part of the second roller.

8. The rollable display apparatus of claim 3, wherein the panel extension sheet comprises:
a panel connection part connected to the flexible display panel;
a roller connection part connected to the first roller through the sheet entrance;
a sheet rolling part between the panel connection part and the roller connection part; and
a circuit cover part between the panel connection part and the sheet rolling part.

9. The rollable display apparatus of claim 8, wherein:
the circuit cover part of the panel extension sheet is configured to move through the sheet entrance; and
when the flexible display panel is unloaded, a portion of each of the panel connection part and the circuit cover part of the panel extension sheet is exposed to an outside of the housing module.

10. The rollable display apparatus of claim 1, wherein the flexible display panel comprises:
a flexible substrate including a display area, a non-display area surrounding the display area, and a pad area in the non-display area;
a pixel array in the display area and defined on one surface of the flexible substrate;
a pad part provided in the pad area, defined on the one surface of the flexible substrate, and connected to the pixel array;
a cover plate covering the pixel array and the non-display area except for the pad part; and
an optical film attached on another surface of the flexible substrate except for one edge of the flexible substrate that overlaps the pad part,
wherein the panel extension sheet is attached on the one edge of the flexible substrate.

11. The rollable display apparatus of claim 1, further comprising:
a panel elevation module in the housing module to raise or lower the flexible display panel according to folding or unfolding of a retractable unit that supports an upper portion of the flexible display panel.

12. The rollable display apparatus of claim 11, further comprising:
a flexible rear cover coupled to an upper portion of each of the flexible display panel and the retractable unit to cover a rear surface of the flexible display panel,
wherein the roller part further comprises a third roller in the housing module, and the flexible rear cover is wound around or unwound from the third roller according to the panel elevation module being raised or lowered.

13. The rollable display apparatus of claim 12, further comprising:
a rear curtain coupled to an upper rear surface of the panel elevation module to cover a rear surface of the panel elevation module,
wherein the roller part further comprises a fourth roller in the housing module, and the rear curtain is wound around or unwound from the fourth roller according to the panel elevation module being raised or lowered.

14. The rollable display apparatus of claim 11, further comprising:
an upper cover coupled to an upper portion of each of the flexible display panel and the panel elevation module; and
a side curtain part in the upper cover to cover both side surfaces of each of the flexible display panel and the panel elevation module.

15. The rollable display apparatus of claim 14, wherein the roller part further comprises:
a first roller connected to the panel extension sheet to wind and unwind the panel extension sheet;

a second roller surrounding an outer circumference surface of the first roller to wind and unwind the flexible display panel; and a roller driver configured to individually rotate each of the first roller and the second roller, wherein the second roller includes a sheet entrance, and wherein the panel extension sheet is configured to move through the sheet entrance.

16. The rollable display apparatus of claim 15, wherein the panel extension sheet further comprises:

a roller connection part connected to the first roller through the sheet entrance;

a sheet rolling part between the panel connection part and the roller connection part; and a circuit cover part between the panel connection part and the sheet rolling part.

17. The rollable display apparatus of claim 14, wherein the flexible display panel comprises:

a flexible substrate including:
a display area,
a non-display area surrounding the display area, and
a pad area in the non-display area;

a pixel array in the display area and defined on one surface of the flexible substrate;

a pad part provided in the pad area, defined on the one surface of the flexible substrate, and connected to the pixel array;

a cover plate covering the pixel array and the non-display area, except for the pad part; and an optical film attached to another surface of the flexible substrate, except for one edge of the flexible substrate that overlaps the pad part, wherein the panel extension sheet is attached to the one edge of the flexible substrate.

18. The rollable display apparatus of claim 14, further comprising:

a panel elevation module in the housing module, the panel elevation module being configured to raise or lower the flexible display panel according to folding or unfolding of a retractable unit that supports an upper portion of the flexible display panel; and a flexible rear cover coupled to an upper portion of each of the flexible display panel and the retractable unit to cover a rear surface of the flexible display panel, wherein the roller part further comprises a third roller in the housing module, and wherein the flexible rear cover is configured to be wound around or unwound from the third roller according to the panel elevation module being raised or lowered.

19. A rollable display apparatus, comprising:

a flexible display panel;

a panel extension sheet including a panel connection part connected to an one edge of the flexible display panel;

a housing module including a panel entrance, the flexible display panel being configured to be loaded into and unloaded from the housing module through the panel entrance of the housing module;

a roller part in the housing module and including a double roller structure, the roller part being configured to individually wind and unwind each of the panel extension sheet and the flexible display panel, wherein, when the flexible display panel is unloaded, the panel connection part of panel extension sheet is exposed to an outside of the rollable display apparatus through the panel entrance of the housing module.

20. The rollable display apparatus of claim 19, wherein:

the flexible display panel includes a display area; and the whole display area of the flexible display panel is exposed to an outside of the rollable display apparatus by the panel connection part of panel extension sheet exposed to an outside of the panel entrance of the housing module.

* * * * *